(12) United States Patent
Stanton (10) Patent No.: US 10,103,546 B2
(45) Date of Patent: Oct. 16, 2018

(54) POWER MANAGEMENT SYSTEM

(71) Applicant: Nextidea Limited, Ohaupo (NZ)

(72) Inventor: Ben Fraser Stanton, Ohaupo (NZ)

( * ) Notice: Subject to any disclaimer, the term of this patent is extended or adjusted under 35 U.S.C. 154(b) by 124 days.

(21) Appl. No.: 15/501,080

(22) PCT Filed: Aug. 6, 2015

(86) PCT No.: PCT/NZ2015/050101
§ 371 (c)(1),
(2) Date: Feb. 1, 2017

(87) PCT Pub. No.: WO2016/022031
PCT Pub. Date: Feb. 11, 2016

(65) Prior Publication Data
US 2017/0256949 A1    Sep. 7, 2017

(30) Foreign Application Priority Data

Aug. 6, 2014    (NZ) ........................................ 625194

(51) Int. Cl.
| | |
|---|---|
| H02J 7/34 | (2006.01) |
| H02J 3/38 | (2006.01) |
| G06Q 50/06 | (2012.01) |
| H02M 7/44 | (2006.01) |
| G06Q 10/06 | (2012.01) |

(52) U.S. Cl.
CPC .............. *H02J 3/382* (2013.01); *G06Q 10/06* (2013.01); *G06Q 50/06* (2013.01); *H02J 3/383* (2013.01); *H02J 3/386* (2013.01); *H02J 7/34* (2013.01); *H02M 7/44* (2013.01)

(58) Field of Classification Search
CPC .... H02J 3/382; H02J 7/34; H02J 3/383; H02J 3/386; H02M 7/44; G06Q 50/06; G06Q 10/06
See application file for complete search history.

(56) References Cited

U.S. PATENT DOCUMENTS

2016/0006253 A1*    1/2016  Saussele ................. H02S 10/20
307/24

* cited by examiner

*Primary Examiner* — Robert DeBeradinis
(74) *Attorney, Agent, or Firm* — Wright, Lindsey & Jennings LLP; K. Brandon Middleton (57) ABSTRACT

A controller and system with a controller that is configured to determine the energy input to an energy storage device at any time and control the activation of one or more electrical load devices. Each load device has an associated load profile data list that includes parameters pertaining to an energy storage threshold parameter and a nominal energy consumption parameter. The controller activates one load devices and controls the power input to the energy storage device by a proportional amount when the energy input to the energy storage device exceeds the nominal energy consumption parameter of the load device.

18 Claims, 4 Drawing Sheets

Load profile data

- Name
- Nominal power consumption
- Min run time in period
- Time period priority
- Max run time in period
- Period start/end
- Period length
- Min on time
- Min off time
- Threshold data

POWER MANAGEMENT SYSTEM

CROSS REFERENCE TO RELATED APPLICATIONS

This application is the U.S. National Stage of International Application No. PCT/NZ2015/050101, filed Aug. 6, 2015, which claims priority to New Zealand application no. 625194, filed on Aug. 6, 2014, both of which are incorporated herein by reference.

FIELD OF THE INVENTION

The present invention relates to a power management system and in particular, but not exclusively, to a system for managing and controlling power storage and consumption in power storage units and power consuming devices.

BACKGROUND TO THE INVENTION

Water tanks are often employed to provide users with heated water. Heated water is drawn from a water tank and usually dispensed from a tap, showerhead, or like device. Alternatively, the heated water may be for other uses such as a heated pool. The water tank normally receives unheated water from a water source, such as a mains water pipe. The water tank typically includes a controller having a user interface that allows a user to set a desired temperature for the water being held by the tank. If the tank's water temperature falls below the desired temperature, then the controller activates a heating element for warming the tank's water. When activated, the heating element begins to heat the water within the tank, and the heating element continues to heat the water until the water's temperature reaches or exceeds the desired temperature. In other arrangements, the controller is a simple thermostat such a bi-metallic strip type thermostat.

Activation of the heating element requires electrical power. In this regard, a heating element is normally comprised of one or more resistive elements that emit heat when electrical current is passed through the heating element. As a result, the operational costs associated with a water heater are directly related to the amount of heat generated by the heating element. More specifically, any increase in the amount of heat generated by the heating element normally increases the energy costs and, therefore, the overall operational costs associated with the water heater.

In some situations, the heating element is simply energised when the temperature of the water is below the thermostat. However, depending factors such as the time of day and the particular source of power, simply energising the heating element may cause undue power consumption.

It is an object of the present invention to provide a way of controlling the temperature of heated water which improves or at least ameliorates some of the abovementioned disadvantage or which at least provides the public with a useful choice. Other objects of the invention may become apparent from the following description which is given by way of example only.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

Accordingly, in one broad aspect, the invention consists in a system for the management of power distributed to one or more load devices, the system comprising:
    a connection to a local energy source,
    a connection to a mains energy source,
    a local power storage unit configured to receive energy from the local energy source and/or the mains power input via a variable regulator operable to control the energy being input to the local energy storage unit,
    one or more load devices configured to receive power from the local energy source and/or the mains power input via a switch, each of the one or more load devices having an associated load profile data list, and
    a controller configured to:
        receive an input indicative of energy being sourced from the mains energy source, or provided to the mains power source, and
        receive an input indicative of the energy stored in the local energy storage unit.

In another board aspect, the invention consists in a system for the management of power distributed to one or more load devices, the system comprising:
    a connection to a local energy source,
    a connection to a mains energy source,
    a local power storage unit configured to receive energy from the local energy source and/or the mains power input via a variable regulator operable to control the energy being input to the local energy storage unit,
    one or more load devices configured to receive power from the local energy source and/or the mains power input via a switch, each of the one or more load devices having an associated load profile data list, and
    a controller configured to:
        determine a consumption to production (CP) ratio based on an input indicative of energy being sourced from the mains energy source, or provided to the mains power source, an input indicative of the energy stored in the local energy storage unit, and
        wherein the controller is further configured to:
            output one or more signals to control the switch to activate a load device, and
            output a signal operable to control the variable regulator such that the determined CP ratio remains as close to a target CP ratio.

In some embodiments, the controller is further configured to evaluate one or more parameters in a data list associated with at least one load device, and select a load device according to one or more criteria.

In some embodiments, criteria are determined by a measure of nominal energy consumption of a load device exceeding the energy being input to the local energy storage unit.

In some embodiments, the controller is further configured to determine the level of stored energy in the energy storage unit, and only activates a load device when the stored energy is above a predetermined threshold.

In some embodiments, the controller is further configured to determine the level of stored energy in the energy storage unit, and deactivates any operational load device when the stored energy is below the predetermined threshold.

In some embodiments, the controller is further adapted to receive or store a desired energy target ratio parameter pertaining to a desired energy ratio between the energy provided to the system by the mains energy source and the energy being provided by local energy source.

In some embodiments, the desired energy target ratio parameter is substantially equal to one.

In some embodiments, controller is configured to calculate an energy target ratio as the energy provided to the system by the mains energy source divided by the energy being provided by local energy source to the system.

In some embodiments, the controller is further configured to output a signal operable to control the energy being input to the local energy storage unit to target the desired energy target ratio dependant one or more parameters in the load profile data list associated with a load device.

In some embodiments, the controller is configured to implement a prioritising process comprising outputting a signal operable to decrease the energy provided to the energy storage unit in response in one or more load devices being activated.

In some embodiments, the controller is configured to adjust the energy provided to the energy storage unit in response to one or more load devices being activated such that the desired energy target ratio is met.

In some embodiments, the prioritising process is implemented until the energy provided to the energy storage unit becomes zero, wherein the controller is configured to deactivate one or more load devices in response.

In some embodiments, the controller is further configured to output a signal operable to increase the power provided to the energy storage unit when one or more load devices are deactivated.

In some embodiments, the controller is further configured to determine energy is being sourced from the mains energy source, and in response, output a signal operable to control the variable regulator to decrease the energy being input to the local energy storage unit to thereby substantially maintain the desired energy target ratio.

In some embodiments, the controller is configured to determine energy is being provided to the mains energy source, and in response, output a signal operable to control the variable regulator to increase the energy input to the local energy storage unit to substantially maintain the desired energy target ratio.

In some embodiments, in use, energy provided by local energy source to the system in excess of consumption by the system is provided to the local energy storage unit by the controller being configured to output a signal operable to increase the energy being input to the local energy storage unit such that the energy target parameter ratio is substantially one.

In some embodiments, the load profile data list of a load device comprises a threshold data parameter and a minimum run time parameter.

In some embodiments, the load profile data list of a load device further comprises one or more of the following parameters:
load name
run time
nominal power consumption
minimum run time in period
time period priority
maximum run time in period
period start/end
period length
minimum on time
minimum off time, and/or
energy threshold data associated with the local power storage unit.

In some embodiments, the controller further comprises a timer adapted to update one or more time dependant parameters in a load profile data list.

In some embodiments, the system further comprises a user interface configured to allow input of one or more of the load profile data list parameters.

In some embodiments, the controller is further configured to operate one or more of the load devices when the energy stored in the local energy storage is above a threshold energy level.

In some embodiments, the controller is further configured to, when one or more load devices are operating:
determine the energy ratio and, when the energy ratio is greater than one, indicating more energy is being produced by the local energy source than is being consumed by the one or more load devices, output a signal operable to control the variable regulator to increase the energy being input to the local energy storage unit to thereby decrease the energy ratio.

In some embodiments, the controller is further configured to, when one or more load devices are operating:
determine the energy ratio variable and, when the energy ratio variable is less than one, indicating energy is being sourced from the mains energy source, output a signal operable to control the variable regulator to decrease the energy being input to the local energy storage unit.

In some embodiments, the controller is configured to deactivate a load device when:
the energy stored in the local power storage unit is less than a predetermined energy threshold, and
the load profile of the load device has a parameter indicative of:
a substantially zero minimum run time parameter, and/or
a minimum run time in period that has elapsed.

In some embodiments, the controller is further configured to output a signal operable to control the variable regulator to increase the energy being input to the local energy storage unit to when the energy stored in the local energy storage unit is below a predetermined threshold.

In some embodiments, the local energy storage unit is a hot water storage unit.

In some embodiments, the hot water storage unit comprises one or more temperature sensors adapted to measure the water temperature of the water in the hot water storage unit.

In some embodiments, at a first temperature sensor is located at or near the bottom of the hot water storage unit.

In some embodiments, a second temperature sensor is located at or near the top of the hot water storage unit.

In some embodiments, the input indicative of the energy stored in the local energy storage unit comprises a signal from the at least one temperature sensor mounted to the hot water storage unit.

In some embodiments, the input indicative of the energy stored in the local energy storage unit comprises an average of the signals from the first the temperature sensor and the second temperature sensor.

In some embodiments, the controller further comprises an input adapted to receive data indicative of the nominal energy consumption for one or load devices.

In some embodiments, the controller is configured to calculate an average nominal energy consumption value for one or more of the load devices.

In some embodiments, the controller is configured to update a load device data list with the calculated average nominal energy consumption value as the nominal energy consumption value.

In some embodiments, the controller is configured to select a load device based on:
the energy target parameter ratio being less than one, and
the nominal energy consumption value of a load device from the load profile data list.

In another board aspect, the invention consists in a controller configured to determine the power input to an energy storage device at any time and, when one or more electrical load devices, each having an associated load profile data list comprising an energy storage threshold parameter and a nominal energy consumption parameter, wherein the control system is configured to, when the energy input to the energy storage device exceeds the nominal energy consumption parameter of the load device, activate the load device and reduce the power input to the energy storage device by a proportional amount.

In some embodiments, the controller is further configured to determine a consumption to production ratio based on energy provided by a local energy source and energy consumed by a premises.

In some embodiments, the controller is further configured to output a signal operable to control the energy input to the energy storage device such that the ratio is equal to one.

In another board aspect, the invention consists in a method of managing power distributed to one or more load devices configured to receive power from a local energy source and/or a mains power input via a switch, each of the one or more load devices having an associated load profile data list and a local power storage unit configured to receive energy from a local energy source and/or a mains power input via a variable regulator operable to control the energy being input to the local energy storage unit, the method comprising:
determining a consumption to production (CP) ratio based on an input indicative of energy being sourced from the mains energy source, or provided to the mains power source, an input indicative of the energy stored in the local energy storage unit, and
outputting one or more signals to control the switch to activate a load device, and
outputting a signal operable to control the variable regulator such that the determined CP ratio remains as close to a target CP ratio.

In another broad aspect the invention relates to any one or more of the above statements in combination with any one or more of any of the other statements.

Other aspects of the invention may become apparent from the following description which is given by way of example only and with reference to the accompanying drawings.

As used herein the term "and/or" means "and" or "or", or both. The term "comprising" as used in this specification and claims means "consisting at least in part of". When interpreting statements in this specification and claims which include that term, the features, prefaced by that term in each statement all need to be present but other features can also be present. Related terms such as "comprise" and "comprised" are to be interpreted in the same manner.

It is intended that reference to any range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference. This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 4(*a*) shows one example of how a temperature sensor is mounted in the sidewall of a hot water storage unit.

FIG. 4(*b*) shows an alternative example of how a temperature sensor is mounted where an insulating layer around the sidewall is removed and a sensor mounted directly to the sidewall surface.

DETAILED DESCRIPTION OF THE INVENTION

When there is no load in the home, embodiments described herein will dump excess energy into a hot water element which will heat it higher than required on a sunny day which will store that energy for cloudy days. On cloudy days if there is not enough solar energy to heat the water, embodiments described herein will sense that the tanks are too low and will switch them over to the controlled rate supply to you can top them up to a medium set temperature from the cheaper electricity.

When heating the water on a sunny day and the load increases and uses more electricity in the home (for example, when a jug is boiled), embodiments described herein will quickly switch the hot water off cylinder so you are not buying unnecessary power from the grid. Then when the jug has finished boiling and there is excess solar available it will turn the hot water back on to reduce your exported electricity. Therefore, embodiments described herein dynamically respond to changes in the load and solar energy.

Embodiments described herein make use of pulse width modulation (PWM) or similar forms of variable control to transfer excess solar energy into the hot water. This allows accurate load matching. This means as loads in the premises and gain from the solar change the system dynamically responds to both reduce the amount of energy that is exported and reduce the amount that is purchased from the grid.

In some embodiments, temperature levels of various appliances are monitored, temperature set points are acted on, minimum "must run" periods are considered together with other parameters such as monitoring and sending alarms based on temperature, 'failed to run', run time, prioritising different appliances based on set up. In some embodiments different appliances have at different run time preferences.

Figure 1:
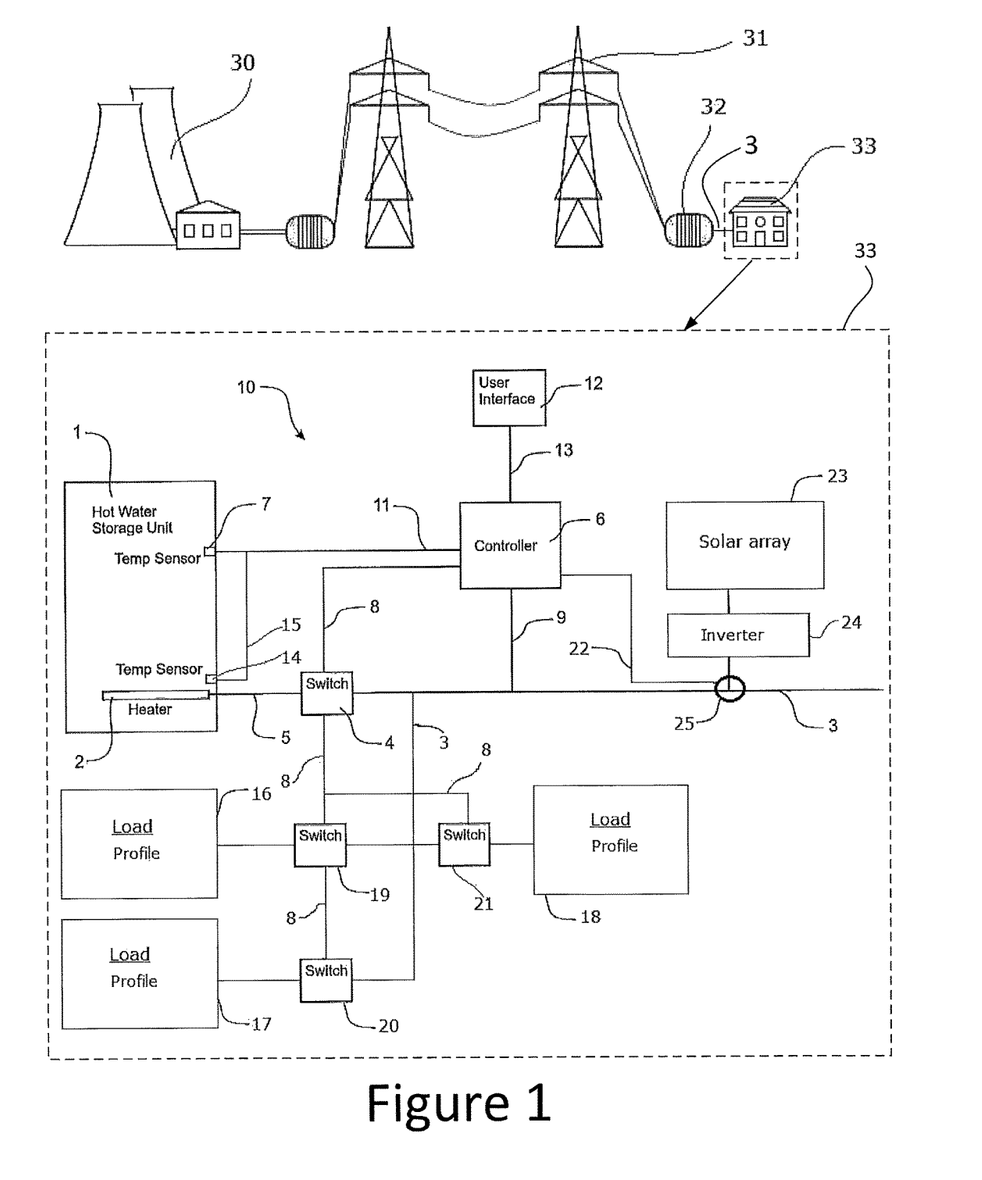
FIG. 1 shows hardware components in exemplary system including a typical power grid that has a power station providing power to power transmission lines and to premises such as a commercial, residential or industrial location.

FIG. 1 shows hardware components in exemplary system including a typical power grid that has a power station 30 providing power to power transmission lines 31 and to premises such as a commercial, residential or industrial location 33. One or more power transmission transformers 32 may be utilised to convert long distance power transmission voltages to mains suitable voltages. Power is typically supplied to the premises by a mains power wire 3.

Embodiments described herein are designed to manage the distribution of power from the power grid to one or more electrical loads on the premises 33. Typical electrical loads include hot water storage units, appliances such as white ware appliances and other electrical devices such as pumps, lighting and the like. In addition, embodiments described herein are designed to manage any local power generation devices located on the premises. Local power generation devices include devices such as solar power generators, wind generators and other similar devices. Where the local power generation devices and the grid power is connected together on a premises, the system is typically known as a grid-connected renewable energy systems.

Grid-connected renewable energy systems are able to power a home or small business with renewable energy during those periods when the sun is shining, the water is running, or the wind is blowing. Any excess electricity produced is able to be fed back into the grid to mitigate the power required from power stations to supply other grid tied homes or businesses. When renewable resources are unavailable, electricity from the grid supplies the needs of the premises.

In addition, power providers (i.e., electric utilities) often allow net metering, an arrangement where the excess electricity generated by grid-connected renewable energy systems "turns back" the electricity meter as it is fed back into the grid. If the property requires more electricity than the local power generation system feeds into the grid during a given time frame, the power provider is typically paid only for the difference between what was used and what was produced. However, the price paid for energy supplied to the grid is typically much less than the cost of drawing power from the grid. Further, the cost of power from the grid is often a factor of the peak power consumption of a property.

Therefore, there is a benefit to be achieved by reducing the peak power consumption that occurs on a particular property. Further, there is a benefit to be achieved whereby and surplus power generated by any local power generation source is used or stored locally so as to minimise the amount of power required from the grid, and also reduce the peak power consumption that occurs.

FIG. 1 further depicts a hot water storage unit 1, however it should be noted that the unit 1 could be any form of energy storage of the kind that may be used in a residential, commercial or industrial environment. For example the energy storage unit could be one or more batteries or a form mechanical energy storage unit. In some embodiments, the energy storage unit is a combination of energy storage units including hot water cylinders, batteries, heated pools and/or a combination of such devices. Embodiments of the invention with more than one energy storage device may prioritise providing power to one of the devices over the other. However, the strategy for management of the incoming power sources described below is equally applicable. The energy storage unit 1 is adapted to receive energy from a power wire 5.

In specific exemplary embodiments described herein, a hot water energy storage unit is discussed. In particular, the hot water storage unit may be a traditional hot water cylinder as such a device requires regular but variable energy input. A hot water cylinder typically has a cold water inlet located at or near the bottom of the cylinder and a hot water outlet is located at or near the top of the cylinder. To heat the water in the unit, a heater element is located near the bottom. Typically, the heater element 2 is a resistive electrical load and the electrical input 5 is used to generate heat that is transferred to the water in the cylinder for heating.

A switch 4 is configured to control the flow of electricity into the heating element 2 of the hot water storage unit 1. The preferred form of the switch is a semiconductor type switch configured to receive a control signal 8 that operates to connect and disconnect the switch. The control signal may be a linear voltage or a pulsed voltage such as the PWM of general switched regulation techniques. For example, a variable PWM control signal provided to the switch allows continuous and linear regulation of the power 5 provided to the heating element 2 between 0% or an off state to 100% or an on state. In some embodiments, the switch 4 is one or more MOSFETs configured to control the how much of the incoming electricity energy is conducted to the heating element when a gate signal is received.

In some embodiments, a controller 6 is provided to manage operation of the component in the system. In some embodiments, the controller 6 is a microprocessor having at least as many inputs and outputs as is required to interface with sensors and other components of the system 10, and is capable of storing and implementing control decisions. The controller includes control logic configured to control the operation and functionality of the controller. The control logic can be implemented in software, hardware, or a combination thereof. In one exemplary embodiment, the control logic, along with its associated methodology, is implemented in software and stored in memory of an instruction execution system, such as a microprocessor, for example. The controller is configured to read any input signals, which may comprise analogue voltages or digital pulses, and is further configured to output signals comprising analogue voltages or digital pulses. Input and output voltage conditioning circuitry may be required to ensure components interfacing with the controller have compatible voltage levels for stable operation.

In the exemplary embodiment depicted in FIG. 1, the hot water storage unit 1 has the heating element located near the bottom of the tank and at least a first temperature sensor 14 located at or near the bottom of the tank. In some embodiments, a second temperature sensor 7 is provided at or near the top of the tank proximate the location where hot water is drawn off for consumption.

Each temperature sensor has a communication channel 15 provided as one or more inputs 11 to the controller 6. In some embodiments, one or more of the sensors 7, 14 communicate wirelessly to the controller 6. In some embodiments, the sensors are powered by a local source of energy such as a battery. Alternatively, the sensors could be powered by a proximate source of electrical power such as the power provided to the heating element 2.

Figure 4:
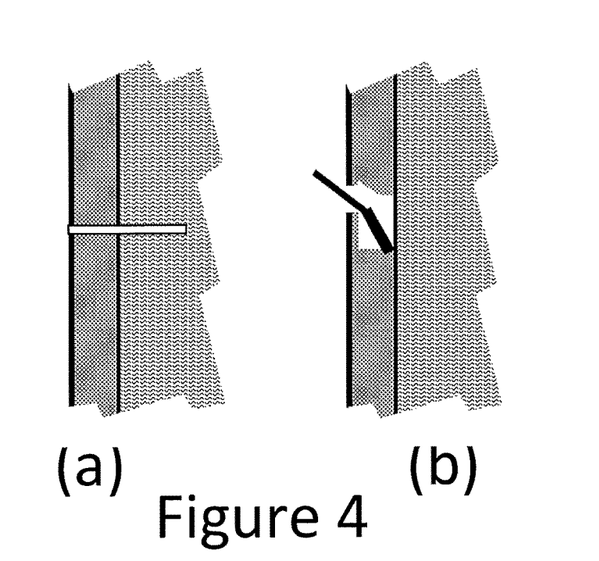

To ensure accurate measurements can be made on the side of a hot water storage unit 1, each of the sensors 7, 14 should be mounted as close to the hot water as possible. That is, inside any insulating layers that may be present on the unit. FIG. 4(*a*) shows one example of how a temperature sensor is mounted. The sidewall of the hot water storage unit is drilled and a thermal well is mounted in the aperture. A sensor may then be inserted inside the thermal well. FIG. 4(*b*) shows an alternative solution where an insulating layer around the sidewall is removed and a sensor mounted directly to the sidewall surface. Insulating layers can be replaced so as to recover the sensor once it has been mounted.

In some installations, the outer skin that wraps around the insulation layer of the cylinder is drilled and the insulation is chipped or moved away to allow the temperature sensor to rest against the inner tank material (copper or stainless steel). This is glued in place to that thermal transfer through the metal gives an accurate indication of the water temperature inside the tank without the need to penetrate the tank vessel. The rest of the void is then filled with insulating glue to hold the sensor into place Referring again to FIG. 1, in some embodiments, the premises 33 has a source of local power generation. For example, the local source could be a solar power generator 23 as shown or a wind power generator. Other forms of local power generation as equally as applicable. As the output of naturally powered energy sources can vary greatly due environmental conditions, an inverter 24 is typically provided between the output of the local energy source 23 and the mains wiring 3. The inverter 24 acts to convert incoming electrical energy into a form harmonised with the mains voltage.

A power monitoring device 25 is connected at the portion of the wiring where the property is connected to the grid power source. The power monitoring device 25 is operable to measure the flow of electricity into in the home, or, where more power is generated by the local power generation source 23 than is being consumed by the premises 33, the flow of electricity flowing out to the grid. Surplus generated local power provided to the grid is known as exporting or backfeeding. The power monitoring device 25 is connected to the controller 6 via a data communication channel 22. In turn, the controller 6 is configured to read the incoming signal and determine the power flowing into or out of the premises. In some embodiments, the power monitoring device 25 is current clamp installed at the meter box of a premises or where the premises local mains wiring connects to the grid.

In addition to the energy storage unit 1 shown, there are a number of other electrical loads connected to the mains power source. In particular, FIG. 1 shows electrical loads 16, 17 and 18, each connected to the mains power source 3 by switches 19, 20 and 21 that are configured to control the energisation of the load connected to it. Any number of loads and a respective control switch could be connected to the mains wiring 3. The controller 6 is configured to output a signal via communication channel 8 to a switch to control the operation of the load connected to that switch. In some embodiments, the communication channel 8 is two-way in that data from a load is communicated back to the controller for storage and/or processing. For example, a load may be configured to send back data including the nominal power consumption and run time.

In some embodiments, the data communication channels, for example 22, 8, 15, 11 and 13, are wired connections. In other embodiments, one or more wireless communication channels may be used. Suitable short range, for example up to around 100 m, wireless communication includes devices such as WiFi or Bluetooth capable devices. Other wireless communication channels suitable for local or short range will be apparent to those skilled in the art. If required, high gain and/or directional antennas may be used to boost the range potential of low powered communication devices.

The controller 6 stores one or more target settings that represent the desired amount of energy be imported from the grid and/or exported to the grid. An importation scenario is where the premises 33 consumes energy and any local power source is unable to meet the premises energy consumption demands. An export scenario is where a local power source is generating more power than is consumed by the premises 33.

In some embodiments, the target is a ratio between consumption and production and can be expressed as the "CP ratio". For example, where the local power source is a solar panel array, the CP ratio is the Consumption of electricity/the production of the Solar Panels. If the CP ratio is less than one, electricity is being exported to the grid. If the CP ratio is greater than one, power is being purchased from the grid.

Figure 2:
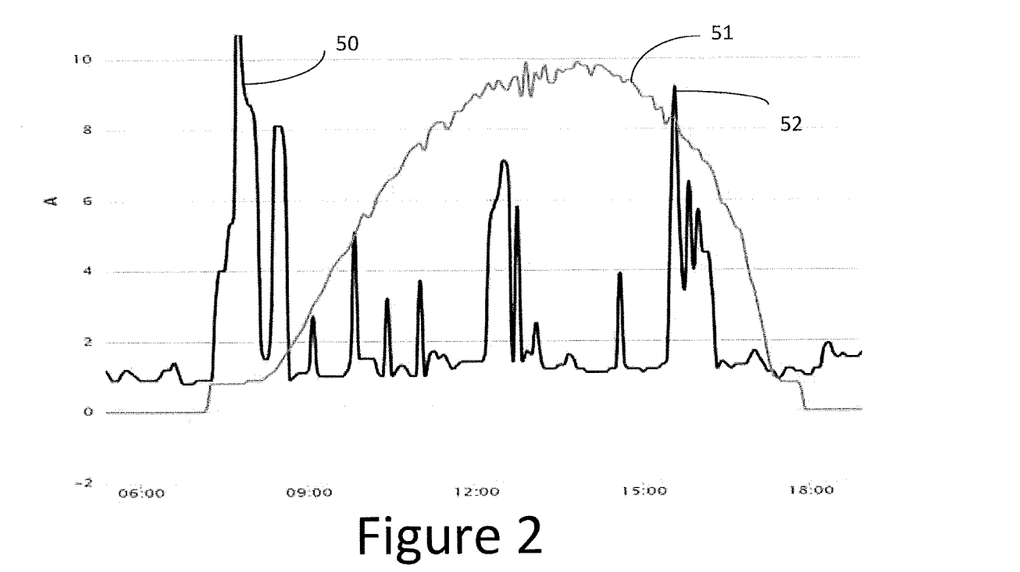
FIG. 2 shows a graph of typical power generated by a local solar system during the span of a day and the power consumed by a typical household.

FIG. 2 shows a graph of typical power generated by a local solar system 51 during the span of a day and the power consumed by a typical household 50. The CP ratio is a product of consumption of power over the production of power. If the production power is higher than the consumption power, then the CP ratio is less than 1 and energy is exported to the grid. If production is lower than consumption, then the CP ratio is greater than 1 and energy is imported from the grid.

The most beneficial CP ratio is equal to one, or as close to one as can be achieved, so that any excess energy produced by a local power source is stored for later use and energy from the grid is not needed or at least energy peaks can be reduced or avoided. Stored energy produced during periods where energy exporting would usually occur is used to offset or mitigate future need to draw power from the grid. Further, it is ideal that any of the electrical loads, for example 16, 17 and 18 are able to operate during periods where the CP ratio would otherwise be greater than one. The controller 6 is configured to implement an operation strategy that operates available and connected electrical loads, and regulates energy provided to the energy storage unit 1, so that the CP ratio is maintained as close to 1 as possible.

Embodiments of the controller are intended to operate in order to keep the CP ratio as close to one as possible at all times. To do this, the controller is configured to control the amount of power being provided to the power storage device, and where there is surplus energy, activate one or more load devices that also require power.

Figure 5:
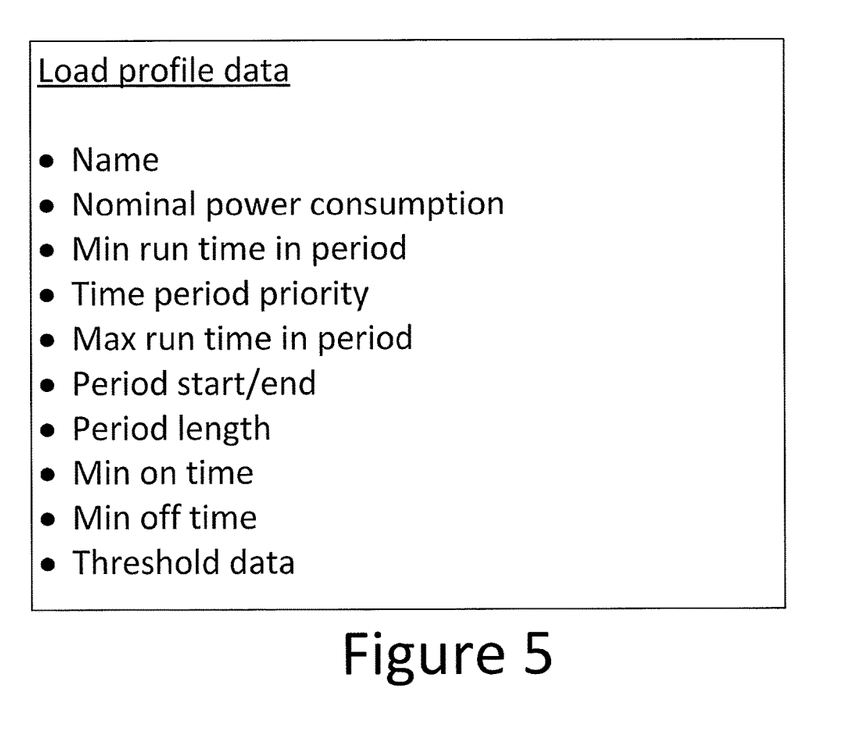
FIG. 5 is a data list of the potentially relevant characteristics of a load.

The particular load devices that are activated are those that have particular characteristics. FIG. 5 is a data list of the potentially relevant characteristics of a load. In particular, the characteristics comprise:

Name
Nominal power consumption
Minimum run time in period
Time period priority
Maximum run time in period
Period start/end
Period length
Minimum on time
Minimum off time
Threshold data These parameters are as follows:

Min Total Run Time—Minimum total run time target for the appliance for each time period.

Maximum Total Run Time—Maximum total run time target for the appliance for each time period.

Period start—Offset within the period length that determines when one period ends and the next one starts.

Period Length—The run time period length (the time period within which the appliance must complete its minimum total run time.

Minimum on time—Minimum time the appliance must be on for before it can be turned off again (to avoid excessive switching on and off which may damage the appliance)

Minimum off time—Minimum time the appliance must be off for before it can be turned on again.

Nominal Power—Nominal power drawn by the appliance when running. Used to determine when the appliance may run based on available power (available power being the power being used by the hot water cylinder to balance the CP ratio)

Threshold data—discuss how threshold data is used as a trigger condition for HWC temps.

Examples parameters in the data list for example load devices are as follows:
Deep Freeze:
Minimum Total Run Time: 16:00:00
Maximum Total Run Time: 17:00:00
Period Start: 01:00:00
Period Length: 1.00:00:00
Minimum On Time: 02:00:00
Minimum Off Time: 00:30:00
Nominal Power: 400 W
Swimming Pool Pump:
Minimum Total Run Time: 02:00:00
Maximum Total Run Time: 03:00:00
Period Start: 13:00:00
Period Length: 1.00:00:00
Minimum On Time: 00:01:00
Minimum Off Time: 00:00:30
Nominal Power: 500 W Bait Freezer (in a cold garage—the less sun there is the colder it is so the minimum run time is low and max run time is high for sunny days):
Minimum Total Run Time: 8:00:00
Maximum Total Run Time: 16:00:00
Period Start: 20:00:00
Period Length: 1.00:00:00
Minimum On Time: 00:30:00
Minimum Off Time: 00:30:00
Nominal Power: 300 W When the consumption increases or the production decreases to a point that the Hot Water Element power has reduced to zero then one of the appliances will turn off to maintain the CP ratio as close to 1 as possible. This process continues for as long as the load prioritizing rules allow.

When Hot Water Temperature is above the Temp Threshold Setting of the Appliance AND HW Power is higher than Nominal Power of the appliance, then the appliance turns on and the Hot Water Power Adjusts to maintain CP ratio at 1.

In some embodiments, a user interface is provided so that one or more of the above load device data parameters can be input to the controller or at least updated. In other embodiments, the controller 6 connects to a database of appliance device load parameters and retrieves data according to load devices on the premises it has control over.

The controller has a timer adapted to update one or more time dependant parameters in a load profile data list. The timer can be also used to schedule the activation of load devices at a certain time of day.

Figure 3:
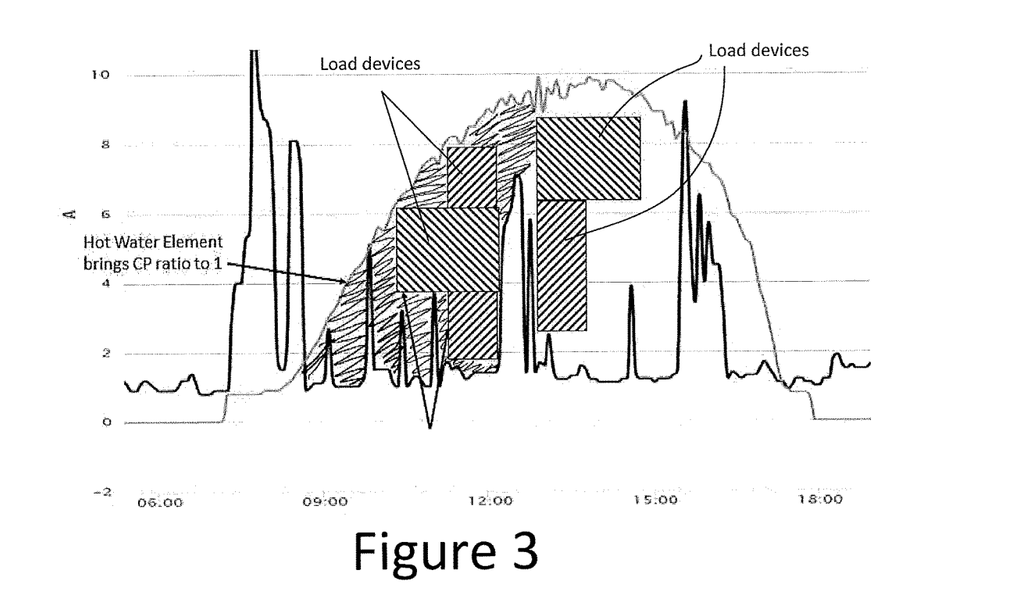
FIG. 3 shows the graph of FIG. 2 with additional features that represent the surplus power at a given time being allocated for other purposes, rather than exporting to the grid.

FIG. 3 shows the graph of FIG. 2 with additional features that represent the surplus power at a given time being allocated for other purposes, rather than exporting to the grid. Generally, the area of the graph between the upper solar power 51 and lower consumption power 50 is power that can be repurposed. At time 52 the consumption of the premises exceeds the solar power production and in this case power would be drawn from the grid to make up the required power difference.

In general terms, the controller 6 is configured to control the system such that, where possible, a load device is activated to consume the surplus power between the baseline and solar output. Further, any surplus power that is still available is directed to the power storage unit, such as a hot water cylinder, when one or more load devices are activated, but activating another load device would cause the consumed power to exceed the solar power production. Or in other words, the controller is configured to manage activation of load devices and the power going into the power storage device such that the CP ratio is as close to one as possible.

As shown in FIG. 3, the activation of one or more load devices builds the consumed power to a level just below the solar power output curve. The surplus power at any given time is then directed to the power storage device. As the power provided to the power storage unit is variable between off and its full power consumption level, the control system is able to make decisions on what loads to activate and how much power should be sent to the energy storage device at any one time. Preferably the controller performs a high speed loop process such that as load devices, such as uncontrollable load devices that may be connected to the mains power 3 are switched on by, for example, users in a house, the controller is able to quickly update the power to the power storage device and/or deactivate one or more load devices so as to maintain the CP ratio as close to one as possible.

It should be noted that load devices connected for activation by the controller may have a number of operation statuses. For example, some load devices may have to run within a certain time period and others may have to operate for at least a particular amount of time per week and so on. An appliance may have any one or more of the above mentioned data list parameters associated with it. In some embodiments, the controller 6 has accessible memory for storage of the data list parameters. Alternatively the controller has a communication channel configured to receive data relating to the data list parameters from other sources.

In some embodiments, the controller is configured to schedule load devices for operation during times of peak solar production. For example, in some embodiments, the controller is configured to schedule operation of load devices that must operate for the likely time of day where peak solar output occurs. The particular time may be input to the controller, or the controller may be configured to monitor and record peak solar production time frames and determine the most likely time based on that data.

The controller is configured to monitor the power being input to an energy storage device, and, when the power level exceeds a nominal power level according to a parameter in a load data parameter list, the controller is configured to activate that load and reduce the power being input to an energy storage device accordingly such that the CP ratio remains equal or close to one. The controller may be configured to evaluate other data list parameters such as the minimum off time parameter which would identify a load as unsuitable for activation. The Maximum Total Run Time parameter may be another that identifies a device as unsuitable for activation should the device have already exceeded the specified time period.

Figure 6:
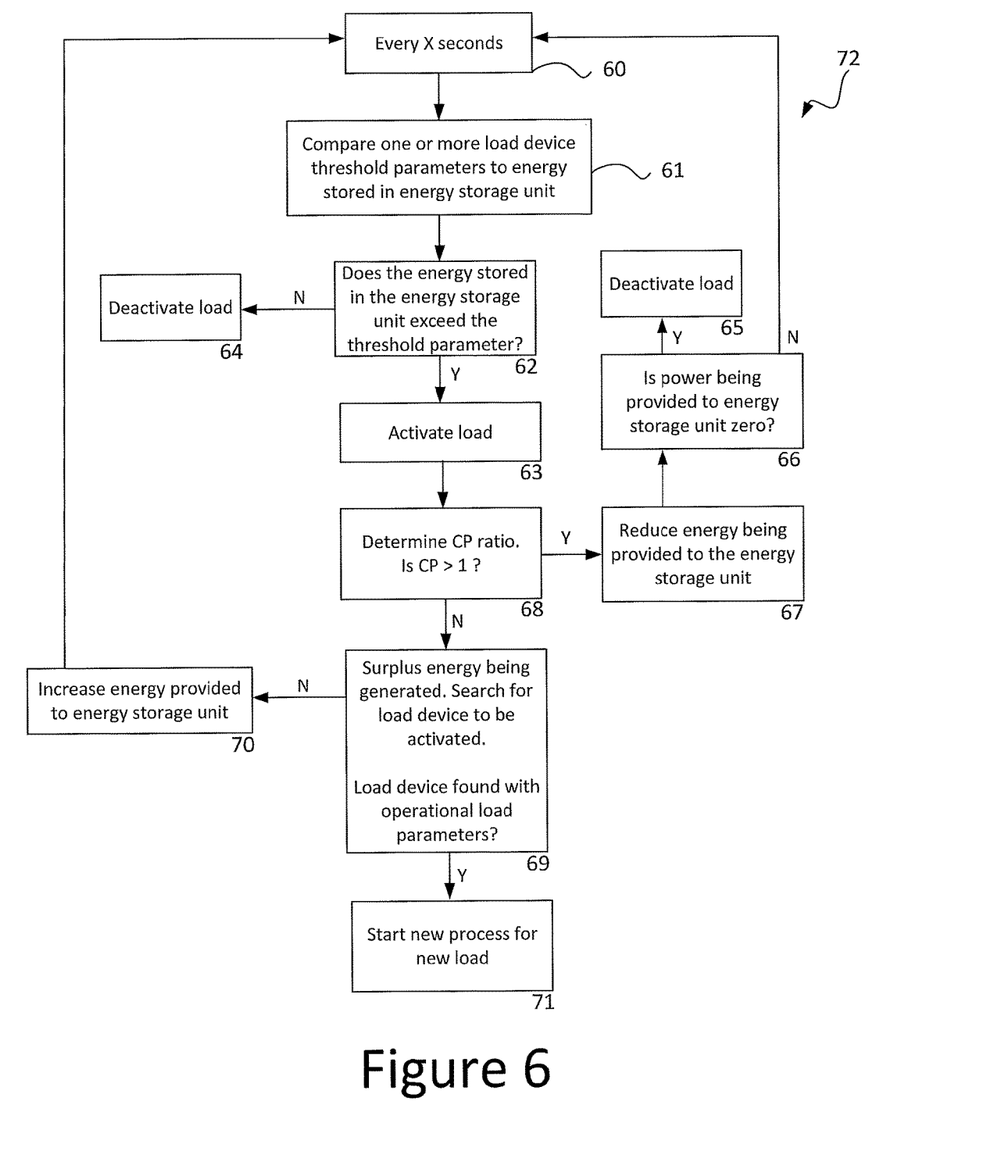
FIG. 6 shows a flow diagram an example of the operational process undertaken by the controller.

FIG. 6 shows a flow diagram of a particular example of the operational process 72 undertaken by the controller. The process 72 is essentially a closed loop process for the selective enabling of electrical loads connected to the premises power sources while also maintaining a desired CP ratio as close to one as possible. The process 72 is operable to manage the power to an energy storage device, such as the hot water cylinder 1 by regulating the power applied to the heating element 2 via control of the regulator 4.

The controller 6 is operable to receive an input indicative of energy being sourced from the mains energy source, or provided to the mains power source, and receive an input indicative of the energy stored in the local energy storage unit. For example, the inputs could be power measurement signals indicative of how much solar energy is being produced and how much power is being consumed by the premises. In addition, the controller 6 has stored, or access to a load profile data list for each of one or more controllable electrical devices.

Generally, the controller operates as part of a system as shown in the exemplary embodiment of FIG. 1, where there is a connection to a local energy source, a connection to a mains energy source and there is a local power storage unit configured to receive energy from the local energy source and/or the mains power input via a variable regulator operable to control the energy being input to the local energy storage unit.

Before a load device is activated, the energy level in the energy storage device is determined 61 to ensure a minimum level. For example, where the energy storage device is a hot water cylinder, the minimum level parameter would be a minimum temperature value. For example, the minimum temperature may be 40° C. Practically, the energy storage device requires a minimum energy to ensure operation of household items in not affected if power were to be diverted from being stored and the energy storage device is required to also provide energy, or hot water. At step 62, the controller 6 is configured to determine whether the energy storage device has a minimum energy stored. If the energy level is not met, at step 64 the controller determines any loads activated, and any loads to be activated should be deactivated. This ensures the energy storage device is allowed to recharge.

From the data list, the controller identifies the nominal current required to operate the load device. That nominal current is then compared to the amount of energy being provided to the energy storage unit. At step 63, the load device is able to be activated if the energy provided to the energy storage unit exceeds the energy required to operate the load device. Consideration of other load data list parameters should also be made before the load device is activated as described above.

At step 68 and once the load has been activated, the CP ratio will abruptly change and is likely to exceed one since the premises load requirements have just increased. If the CP ratio is greater than one, at step 67 the controller outputs a signal operable to, for example, reduce the PWM duty cycle of the switch 4 which in turn reduces the energy being provided to the energy storage unit. At step 66, a check is made to ensure the energy being provided to the energy storage unit has not been completely switched off. For example, the check may be a determination of the PWM duty cycle to ensure a non-zero or minimum value. If a zero duty cycle value or equivalent is determined, at step 65 one or more of the load devices is deactivated. Consideration of other load data list parameters should also be made before the load device is deactivated. For example, if the load has a minimum run period that has not yet elapsed, the load should continue running. In such circumstances, power may be required to be drawn from the grid supply and the CP ratio maintained above one until the load is able to be deactivated.

At step 68, if the CP ratio is determined to be greater than one, the controller is able to determine there is excess power being provided by the local energy source. For example, a solar array is generating more power than is being consumed by the premises and any load devices that are activated. The controller is then able to distribute the excess energy into other load devices that are scheduled to run when the power requirements are available and/or increase the power being supplied to the energy storage unit.

At step 70, the controller is configured to increase the energy being supplied to the energy storage unit. For example, the controller outputs a signal operable to increase the conduction of the switch 4 such as increasing the PWM duty cycle. The process is able to loop back to step 68 where further refinements of energy provided to the energy storage unit can be made.

At step 69, the controller is configured to identify one or more other load devices that have parameters in the data list suitable to be activated. In such circumstances, the energy provide to the energy storage unit can be reduced again so that another load device with suitable parameters is able to operate. Suitable data list parameters may simply be that the energy level in the energy storage unit has exceeded a threshold, in which case the load device is able to be activated.

For example, if a load device has a nominal power consumption of 200 W, and the power provided to the energy storage unit is 300 W, the controller is able to reduce the power provided to the energy storage unit by 200 W and activate the 200 W load device.

In another example, the load device has a threshold data parameter relating to the energy in the energy storage unit. Where the energy storage unit is a hot water cylinder, the threshold data could be the temperature of the water in that cylinder. When the controller determines the temperature of water in the cylinder, it may then evaluate one or more load devices with a threshold data list parameter that meets or exceeds the water temperature. That is, if the load device threshold parameter is 40° C. and the controller determines the hot water temperature is 41° C., the load device could be activated. Alternatively, if the load device threshold parameter is 40° C. and the controller determines the hot water temperature is 39° C., the load device would not be suitable to be activated.

Due to fluctuations in the energy output by renewable energy sources, the above described system is able to adaptively make use of all locally generated power and minimise the requirement for power to be drawn from the grid. Further, surplus power is able to be stored for later use, for example as hot water, rather than being exported to the grid.

At water temperatures above 60° C., harmful bacteria are killed. However, it is desirable to operate with the temperature of the water below 60° C. for reasons including mitigating the risk of injury by burning and/or reducing energy consumption. Energy consumption can be lowered by lowering of the temperature that would otherwise have been used to heat the water to a higher temperature. The lowering of the water temperature also provides improved safety by enabling water temperatures incapable of burning. However, lowering the temperature of water below 60° C. generates a health risk in that bacteria, such as legionella, is able to grow. Further, lowering the temperature of water in a hot water storage device poses a risk of running out of hot water entirely, particularly in limited supply domestic environments. Therefore, energy saving potential and/or greater safety through lowering the temperature must be considered against factors such as the risk of running out available of hot water.

Lowering of the water temperature (to obtain improved use of energy or safety advantages) is generally achieved by controlling the temperature of water to a particular target temperature below 60° C., for example, 45° C. A bacteria killing cycle or 'biocycle' is where the water in a water storage unit (that is otherwise controlled to a temperature that is lower than 60° C.) is heated to at least 60° C. after a period of time. The controller can be configured to initiate a biocycle process when desired. The biocycle process comprises periodically heating water to a temperature adequate for killing bacteria such as legionella.

In addition, the controller may implement any one r more of the following functions:

Start—For each appliance with a number of profile parameters:

Check temperature of HWC. Use temp as a trigger point for switching on the appliance.

For example, the appliance has profile parameters.

If the HWC temp>appliance trigger threshold–activate appliance

Controller—checks CP ratio to ensure not greater than one—where energy is being imported from the grid. If the CP ratio is greater than one and energy is being draw from the grid—reduce energy being supplied to the HWC to reduce heating and assume target of CP=one. HWC input energy lowered by decreasing the PWM duty cycle of the switch 4.

Controller—check CP ratio. If less than one there is excess energy available it is possible to activate a non-mandatory appliance. Select an appliance to energise. Controller checks CP ratio to ensure not greater than one—where energy is being imported from the grid. If the CP ratio is greater than one and energy is being draw from the grid—reduce energy being supplied to the HWC to reduce heating and assume target of CP=one.

If no appliances require activation, the controller is configured to adjust the energy provided to the HWC to maintain the CP=1 ratio.

If minimum on time elapsed, and CP ratio is greater than 1: switch off optional appliance.

Where in the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope or spirit of the invention.

The invention claimed is:

1. A system for the management of power distributed to one or more load devices, the system comprising:
   a. a connection to a local energy source,
   b. a connection to a mains energy source,
   c. a local energy storage unit configured to receive energy from at least one of the local energy source and the mains energy source via a variable regulator operable to control the energy being input to the local energy storage unit,
   d. one or more load devices configured to receive energy from at least one of the local energy source and the mains energy source via one or more switches, each of the one or more load devices having an associated load profile data list, and
   e. a controller configured to:
      i. determine a consumption to production (CP) parameter based on an input indicative of energy being sourced from the mains energy source, or provided to the mains energy source, and
      ii wherein the controller is further configured to:
         a. output one or more signals to control the switch to activate or deactivate one or more of the load devices, and
         b. output a signal operable to control the variable regulator such that the determined CP parameter targets a desired CP parameter.

2. A system as claimed in claim 1, wherein the controller is further configured to receive an input indicative of the energy stored in the local energy storage unit, and output one or more signals to control one or more switches to activate or deactivate one or more of the load devices based on the energy stored in the local energy storage unit.

3. A system as claimed in claim 1, wherein the controller is further configured to evaluate one or more parameters in the profile data list associated with at least one load device, and select a load device for activation or deactivation based on the energy stored in the local energy storage unit.

4. A system as claimed in claim 1, wherein the controller is further configured to select a load for activation based on a measure of nominal operational energy consumption of a load device exceeding the energy being input to the local energy storage unit.

5. A system as claimed in claim 1, wherein the desired CP parameter is substantially equal to one.

6. A system as claimed in claim 1, wherein targeting the desired CP parameter has the effect of minimising or eliminating energy being required from the main energy source.

7. A system as claimed in claim 1, wherein the controller is further configured to determine the energy provided by the local energy source to the system is in excess of a consumption demand of one or more activated load devices, and in response, output a signal operable to increase the energy being input to the local energy storage unit.

8. A system as claimed in claim 1, wherein the CP parameter is a ratio determined by the energy provided to the system by the mains energy source divided by the energy being provided by local energy source to the system.

9. A system as claimed in claim 1, wherein the controller is further configured to output a signal operable to control the energy being input to the local energy storage unit to target the desired CP parameter dependant on one or more parameters in the load profile data list associated with a load device.

10. A system as claimed in claim 1, wherein in the controller is further configured to control one or more of the following operations:
  decrease the energy provided to the local energy storage unit in response to one or more load devices being activated such that the desired CP parameter is met,
  deactivate any operational load device when the stored energy in the local energy storage unit is below a predetermined threshold,
  activate one or more load devices when the stored energy in the local energy storage unit is above a predetermined threshold energy level,
  activate one or more load devices until the energy provided to the local energy storage unit becomes zero, wherein the controller is configured to then respond by deactivating one or more of the load devices,
  determine energy is being sourced from the mains energy source, and in response, output a signal operable to control the variable regulator to decrease the energy being input to the local energy storage unit to thereby substantially maintain the desired CP parameter,
  determine energy is being provided to the mains energy source, and in response, output a signal operable to control the variable regulator to increase the energy input to the local energy storage unit to substantially maintain the desired energy target ratio,
  when one or more load devices are operating and when the CP parameter is less than one, indicating more energy is being produced by the local energy source than is being consumed by the one or more load devices, output a signal operable to control the variable regulator to increase the energy being input to the local energy storage unit to thereby decrease the energy ratio, and
  when the CP parameter variable is greater than one indicating energy is being sourced from the mains energy source, output a signal operable to control the variable regulator to decrease the energy being input to the local energy storage unit.

11. A system as claimed in claim 1, wherein the load profile data list of a load device further comprises one or more of the following parameters:
  an energy threshold data parameter identifying a minimum level of energy in the local energy storage unit to enable activation
  name of the load
  run time
  nominal power consumption
  minimum run time in period
  time period priority
  maximum run time in period
  period start/end
  period length
  minimum on time, and
  minimum off time.

12. A system as claimed in claim 11, wherein the controller is configured to deactivate a load device when:
  a. the energy stored in the local energy storage unit is less than a predetermined energy threshold, and
  b. the load profile of the load device has a parameter indicative of at least one of:
    i. a substantially zero minimum run time parameter,
    ii. a minimum run time period that has elapsed, and
    iii. a elapsed minimum run time is less than a remaining available operating period.

13. A system as claimed in claim 12, wherein the controller is configured to select a load device based on:
  a. the energy threshold data parameter being less than one, and
  b. the nominal energy consumption value of a load device from the load profile data list.

14. A system as claimed in claim 1, wherein the local energy storage unit is a hot water storage unit comprising a heater circuit for heating stored water.

15. A system as claimed in claim 14, wherein the hot water storage unit comprises a first temperature sensor located at or near a bottom of the hot water storage unit and a second temperature sensor located at or near a top of the hot water storage unit.

16. A system as claimed in claim 15, wherein the input indicative of the energy stored in the local energy storage unit comprises an average of the signals from the first the temperature sensor and the second temperature sensor.

17. A controller configured to determine the energy input to an energy storage device at any time and control the activation of one or more electrical load devices, each load device having an associated load profile data list comprising an energy storage threshold parameter and a nominal energy consumption parameter, wherein the controller is configured to activate the load device and reduce the power input to the energy storage device by a proportional amount when the energy input to the energy storage device exceeds the nominal energy consumption parameter of the load device.

18. A method of managing power distributed to one or more load devices configured to receive power from at least one of a local energy source and a mains power input via a switch, each of the one or more load devices having an associated load profile data list and a local power storage unit configured to receive energy from at least one of the local energy source and the mains power input via a variable regulator operable to control the energy being input to the local energy storage unit, the method comprising:
  a. determining a consumption to production (CP) parameter based on an input indicative of energy being sourced from the mains energy source, or provided to the mains power source, an input indicative of the energy stored in the local energy storage unit, and
    i. outputting one or more signals to control the switch to activate a load device, and
    ii. outputting a signal operable to control the variable regulator such that the determined CP parameter targets a desired CP parameter.

* * * * *